INVENTOR
Shinichi Soma

INVENTOR
Shinichi Soma

INVENTOR
Shinichi Soma

INVENTOR
Shinichi Soma

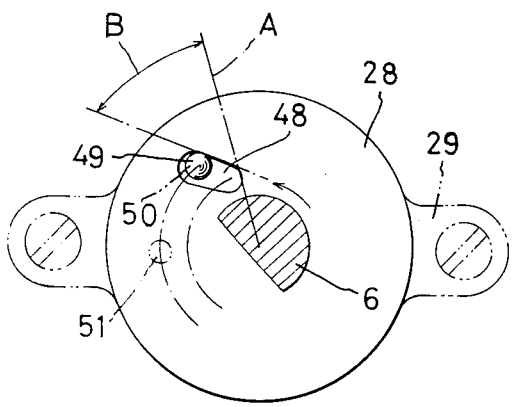
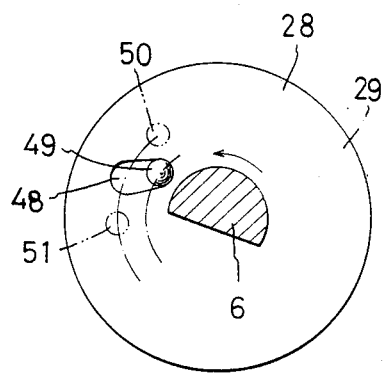
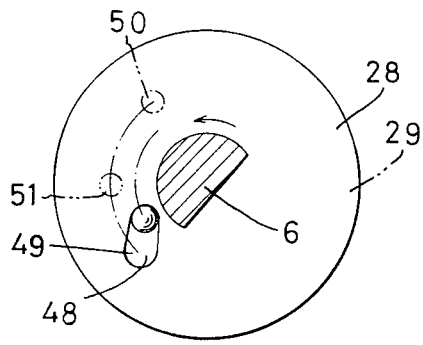
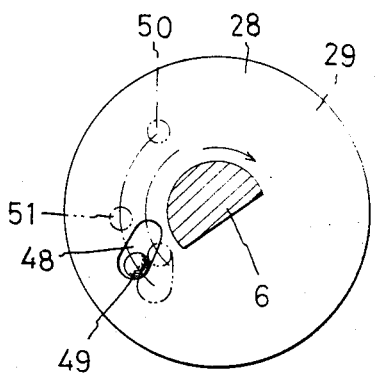
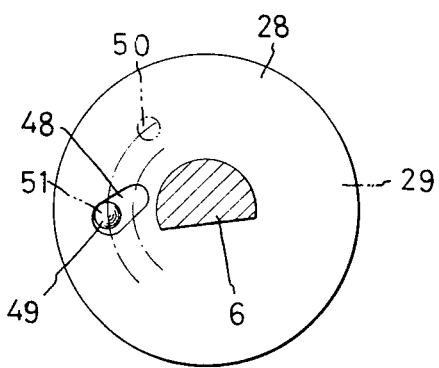

United States Patent Office 3,676,047
Patented July 11, 1972

3,676,047
GAS CONTROL VALVE MEANS HAVING A
PIEZOELECTRIC FIRING UNIT
Shinichi Soma, Okazaki-shi, Japan, assignor to Kabushiki
Kaisha Rinnai Seisakusho, Nagoya-shi, Japan
Filed Mar. 31, 1971, Ser. No. 129,842
Claims priority, application Japan, Aug. 10, 1970,
45/69,206
Int. Cl. F23q 3/00
U.S. Cl. 431—255
11 Claims

ABSTRACT OF THE DISCLOSURE

A gas control valve apparatus comprises a valve unit operated by a rotatable shaft to first open a pilot gas passage after which rotation is automatically stopped and at this time, a cocked hammer is released to strike a piezoelectric firing unit and effect a spark discharge to ignite the pilot burner. The stop of the rotation of the shaft is released automatically by removal of the actuating torque on the shaft whereby the shaft can be further rotated to bring the valve unit to a position in which a gas passage for the main burner is fully opened.

BRIEF SUMMARY OF THE INVENTION

This invention relates to a gas control valve apparatus having a piezoelectric firing unit.

An object of the invention is to provide such apparatus wherein discharging a pilot gas by opening a pilot gas passage, firing the pilot gas by operating the piezoelectric firing unit and opening a gas passage for a main burner are effected successively in the above order solely by a rotation in one direction of an operation shaft, and during this operation there is no performance of any separate operations such as pushing, pulling or the like, whereby the operation is simple and errors in the operation are prevented.

Another object of the invention is to provide means in said apparatus such that at the time of opening of the pilot gas passage, the rotation of the operation shaft is stopped and at the same time a spark discharge by the piezoelectric firing apparatus is effected for firing the pilot gas, and after the completion of the pilot gas firing, a rotating torque acting on the operation shaft is removed whereby the shaft is released from the foregoing stop and by further rotation of the operation shaft in the same direction, the gas passage for the main burner is fully opened. Additionally, the operation shaft can be freely rotated in the reverse direction after completion of service.

The apparatus according to the invention is characterized in that after a pilot gas passage is first opened by rotation of the operation shaft, rotation is automatically checked, and at the time of this stop, a spark discharge by the piezoelectric firing apparatus is effected in relation to the rotation of the operation shaft, and by removing the rotating torque from the operation shaft, the check of the operation shaft is automatically released, and by further rotating the operation shaft in the same direction, a gas passage for a main burner is fully opened.

BRIEF DESCRIPTION OF THE DRAWING

FIGS. 23 to 27 are digrammatic front views showing the operation of apparatus for confirming the rotating position during reverse rotation of the operation shaft.

DETAILED DESCRIPTION

Figure 1:
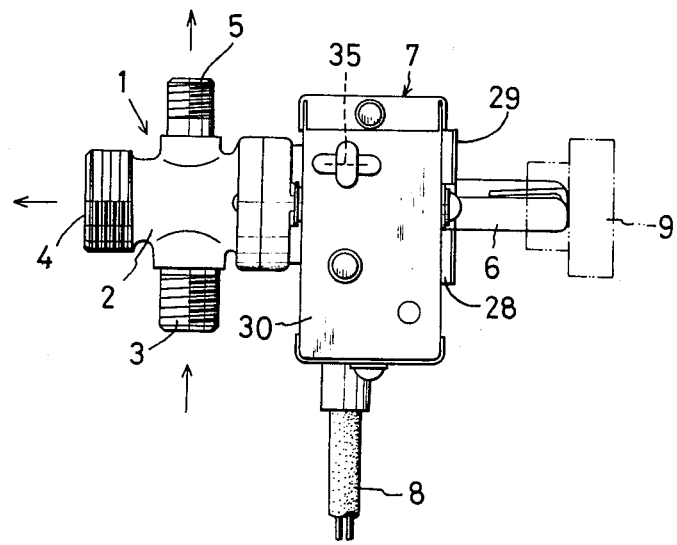
FIG. 1 is a side elevation view of one embodiment according to this invention.
Figure 2:
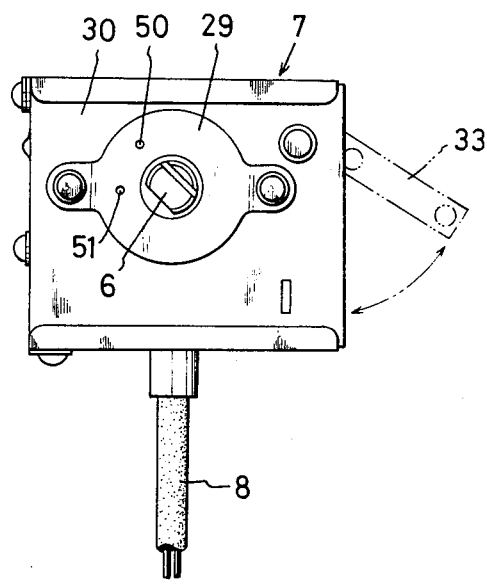
FIG. 2 is a front elevation view thereof.
Figure 3:
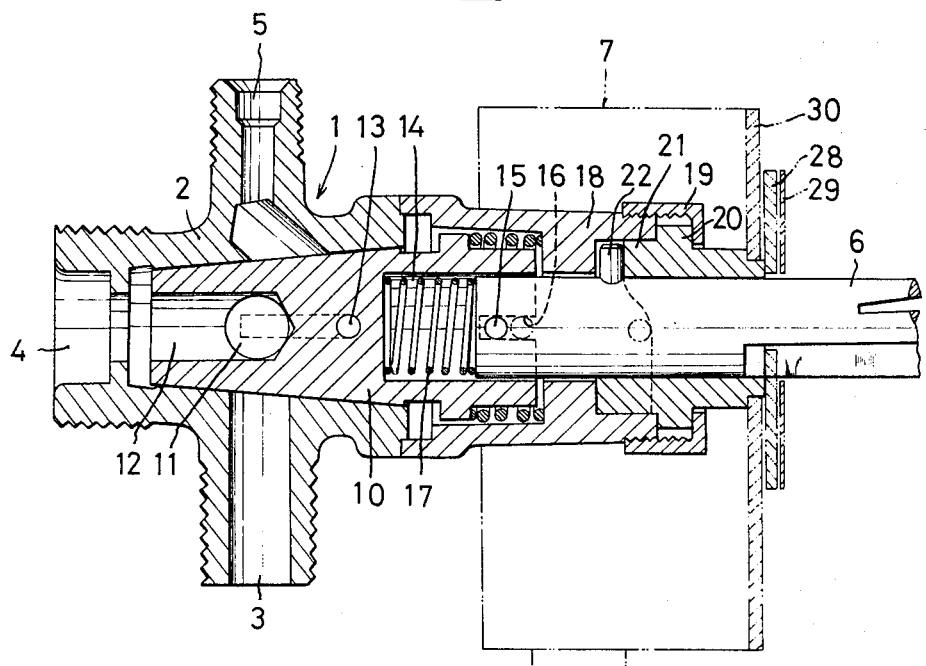
FIG. 3 is a sectional side view of a valve portion thereof.
Figure 4:
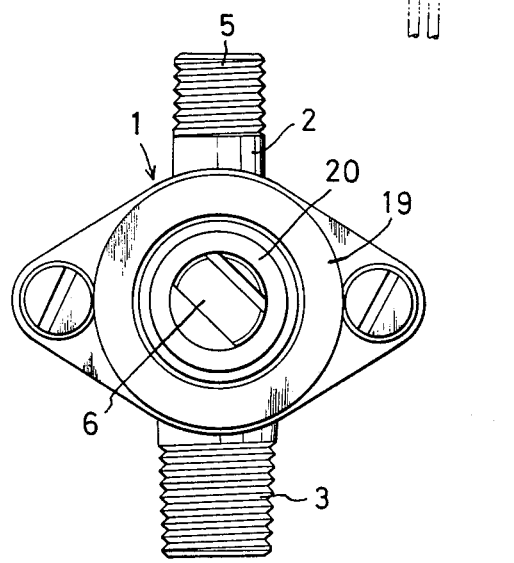
FIG. 4 is a front elevation view of the same.

Numeral 1 denotes a control valve comprising a shell body 2 provided with a stub inlet 3 connected to a gas supply source, a stub outlet 4 connected to a main burner and a stub outlet 5 connected to a pilot burner. A taper cock 10 is rotatably mounted in the interior of body 2. An operation shaft 6 is coupled to cock 10 for rotating the same and shaft 6 projects therefrom. A knob 9 is attached to shaft 6. Surrounding the operation shaft 6 is piezoelectric firing apparatus 7 operable by the rotation of the shaft 6. Numeral 8 denotes electrical power lines for the firing apparatus 7.

The taper cock 10 is provided with gas passage openings 11, 12, 13 for connecting the inlet 3 with the outlets 4 and 5 in accordance with the rotation of cock 10. An end portion of the operation shaft 6 is mounted in a bore 14 in the base end portion of the cock 10, and a pin 15 on the operation shaft 6 is loosely mounted in a longitudinal groove 16 in the side wall of the cock at bore 14. The operation shaft 6 is urged outwards by a coil spring 17 contained in the bore 14.

The operation shaft 6 is supported by a bearing 20 which is connected through a cap 19 to the front portion of a drum body 18 connected to the shell body 2. A cam 21 is formed on the rear end surface of the bearing 20, and a pin 22 on the operation shaft 6 is in contact with cam 21. A casing 30 for the piezoelectric firing apparatus 7 is attached to the front end surface of the bearing 20.

Figure 6:
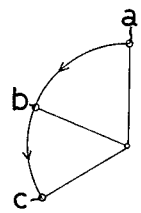
FIG. 6 is a diagram showing the relation between valve rotating angles and openings.
Figure 9:
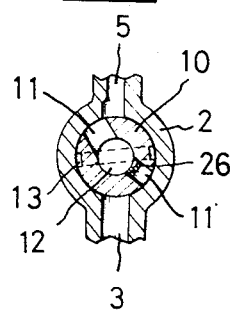
FIGS. 9 to 11 are sectional views, each similar to FIG. 7, showing opening conditions at other rotating positions of a rotation member.

When the control valve 1 is located at position a in FIG. 6, it is in closing position as shown in FIG. 9, and none of the openings 11, 12, 13 in the taper cock 10 are in coincidence with the inlet 3.

Figure 8:
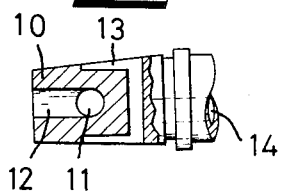
FIG. 8 is a sectional view taken along line VIII—VIII in FIG. 7.
Figure 10:
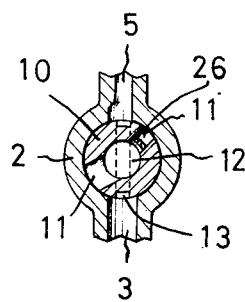

If the valve 1 is rotated by the operation shaft 6 in the direction of the arrow in FIG. 6, the valve reaches a position b whereat the taper cock 10 is brought to a pilot gas position as shown in FIG. 10. Therein the gas passage opening 13 is in coincidence with the inlet 3 and since this gas passage opening 13 is bent, as shown in FIG. 8, and connected at its other end with the outlet 5 to the pilot gas burner, the latter is supplied with gas.

Figure 11:
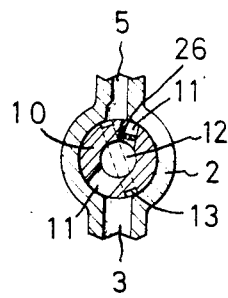

If the operation shaft 6 is further rotated, as shown in FIG. 11, the gas passage opening 11 for the main burner is opened to inlet 3 before the gas passage opening 13 is closed thereto while a pilot gas side opening 11' extending from the opening 11 to the opposite side is opened to the pilot gas outlet 5, and thus an additional pilot gas passage is formed before the pilot gas opening 13 is closed.

Figure 5:
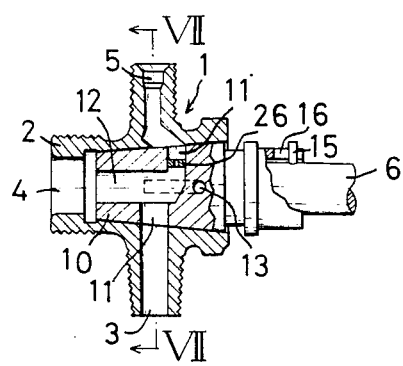
FIG. 5 is a sectional side view of the valve thereof.
Figure 7:
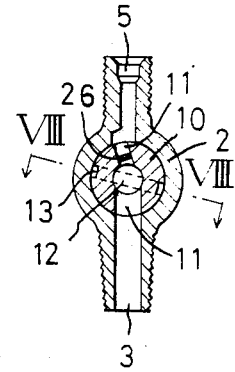
FIG. 7 is a sectional view taken along the line VII—VII in FIG. 5.

If the taper cock 10 is further rotated by the operation shaft 6, the valve is brought to a full open position as shown at position c in FIG. 6, and corresponding to the conditions shown in FIGS. 5 and 7. In this case, the inlet 3 is in communication through the main burner gas passage openings 11 and 12 with the outlet 4, and also gas is supplied from the main burner gas supply opening 11 to the pilot gas outlet 5 through the side opening 11'. Thus, gas passes to the pilot burner through the pilot gas passage opening 13 at the position b in FIG. 6 and passes through the side opening 11' during supply to the main burner. Accordingly, the pilot gas burner is kept burning during th time of burning of the main burner. The side opening 11' is provided therein with an orifice 26 for controlling the amount of gas passing therethrough.

Figure 12:
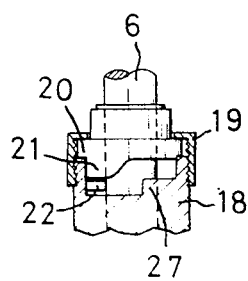
FIGS. 12 to 14 are sectional views of an operating shaft and an automatic stop action control device therefor.
Figure 13:
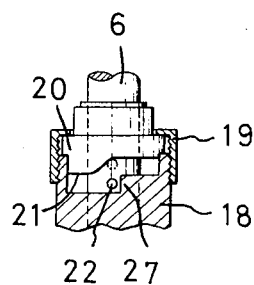
Figure 14:
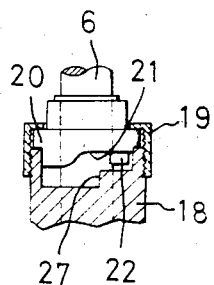

When the operation shaft 6 is located at the "off" position a in FIG. 6, the outer surface of the pin 22 is in contact with a projecting portion of the cam 21 at the rear end surface of the bearing 20 as shown in FIG. 12. If the shaft 6 is rotated to the pilot gas position b in FIG. 6, the pin 22 leaves the projecting portion of the cam 21 and is brought into contact with a stop 27 provided on the inner side of the casing 18 so that rotation of the shaft 6 is stopped. Although, in this case, the operation shaft 6 is always pushed forward by the coil spring 17, the shaft 6 is subjected to a torque required for rotating the taper cock 10 and additionally a torque required for driving of the piezoelectric firing apparatus mentioned hereinafter, accompanying these torques is a pressure force on shaft 6 concurrently opposing the pushing force of the coil spring 17 whereby the operation shaft 6 can be kept in contact at its pin 22 with the stopper 27.

If the force applied to the operation shaft 6 is removed after the rotation of the operation shaft 6 is stopped by the stop 27, the rotating torque becomes zero, and the operation shaft 6 is pushed forwards by the action of the spring 17 and the pin 22 is free from the stop 27. Accordingly, the operation shaft 6 is free to be rotated further in the same direction and to reach the full open position at c in FIG. 6 for effecting fuel supply to the main burner.

Figure 15:
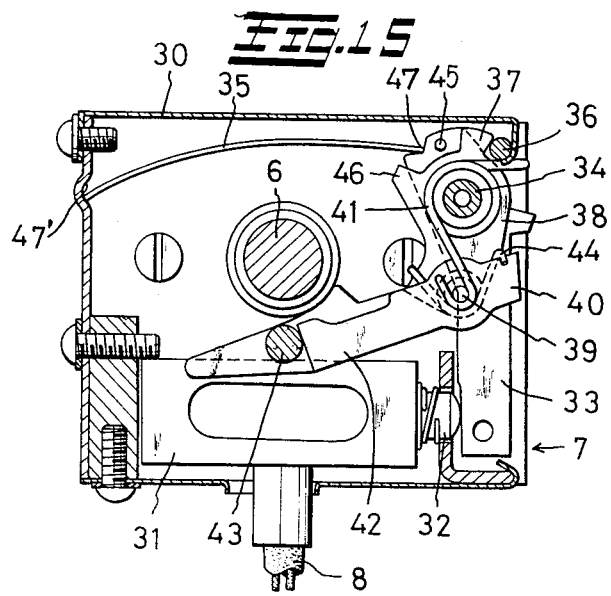
FIG. 15 is a sectional front view of a piezoelectric firing apparatus.
Figure 16:
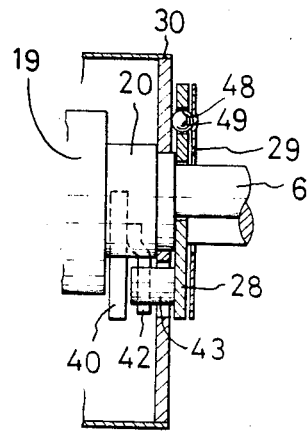
FIG. 16 is a fragmental sectional side view of the same viewed in a direction perpendicular thereto.

The casing 30 containing the piezoelectric firing apparatus 7 for firing the pilot gas burner is secured at its back end to the bearing 20 as shown in FIGS. 15 and 16. A driving plate 28 rotatable with the operation shaft 6 is mounted adjacent the outer surface of the casing 30 and is engaged at the outside thereof by a resilient holding plate 29. The driving plate 28 is rotatable with shaft 6 but is slidable forward and rearwards in relation thereto.

A piezoelectric element unit 31 is secured within the casing 30, and a hammer 33 which abuts a striking terminal 32 of the unit 31 is loosely mounted on a shaft 34. A leaf spring 35 is supported at one end by a supporting point 47' of the casing 30 and is engaged at its other end in an engaging groove 47 in the upper portion of the hammer 33, so that the hammer 33 is normally urged into pressure contact with the striking terminal 32. On the shaft 34 there is mounted an arm 38 which is limited in one direction of rotation by abutment of a projection 37 thereof with an engaging pin 36 on the side of casing 30. A lever 40 is loosely mounted on a pin 39 on the arm 38, and the arm 38 with the lever 40 is urged in the clockwise direction by a spring 41. A projecting member 42 is integrally attached to the lever 40 and is positioned to abut a pin 43 projecting from the driving plate 28 driven by the operation shaft 6. The lever 40 is also urged in the clockwise direction by a spring 44.

Figure 17:
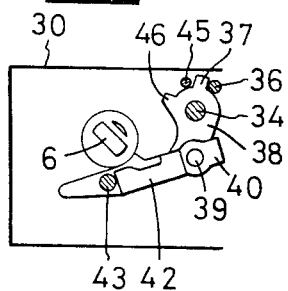
FIGS. 17 to 19 are diagrammatic front views showing the operation of the piezoelectric firing apparatus.
Figure 18:
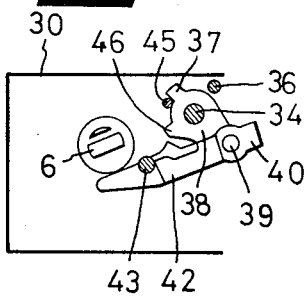
Figure 19:
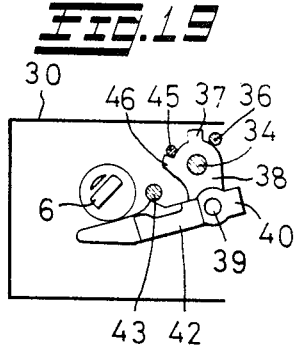
Figure 20:
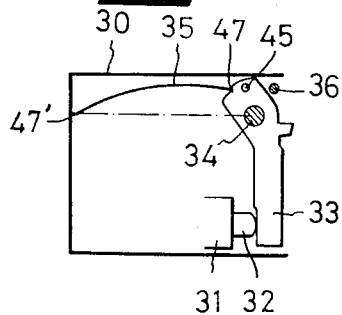
FIGS. 20 to 22 are diagrammatic front views showing the operation of a hammer thereof.
Figure 21:
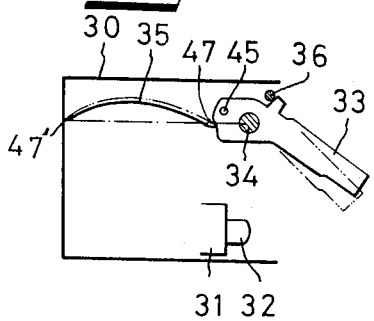
Figure 22:
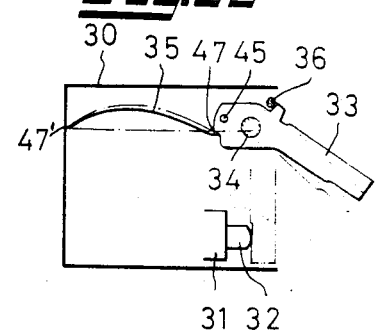

If, from the position of FIG. 17, the projecting member 42 is pushed by the pin 43 as a result of the rotation of the driving plate 28, the lever 40 causes the arm 38 to rotate in the counterclockwise direction, so as to be in the position shown in FIG. 18. By this operation, the projection 37 of the arm 38 pushes against a pin 45 on the hammer 33 to rotate the hammer 33 in the counterclockwise direction from the position in FIG. 20 to the position in FIG. 21. During this rotation, the leaf spring 35 acting on the hammer 33 is gradually bent and when it approaches the terminal point in bending, that is, when the engaging point 47 between the hammer 33 and the leaf spring 35 passes slightly beyond the dead point existing on a line connecting the engaging point 47' of the other end of the leaf spring 35 and the shaft 34 for the hammer 33, the hammer 33 abuts the pin 36 so that its rotation is stopped thereby.

When the operation shaft 6 is further rotated, the pin 43 of the driving plate 28 is disengaged from the projecting member 42, whereby the lever 40 is rapidly returned to its initial position along with the arm 38 by the action of the spring 41. At this time, a projection 46 on the arm 38 pushes the pin 45 of the hammer 33 in the clockwise direction to rotate the same, so that the leaf spring 35 is returned to its initial condition after passing through the foregoing dead point and causes the hammer 33 to rotate rapidly and strike the piezoelectric unit element 31, whereby a high voltage is produced in the unit element and this voltage is lead to a suitable spark gap to produce an electric discharge for firing the pilot gas burner.

This electric discharge operation of the piezoelectric firing apparatus 7 is effected within the rotation range from a to b in FIG. 6.

Thus, the pin 43 of the driving plate 28 becomes free as released from the projecting member 42 of the lever 40, so that the operation shaft 6 is free to rotate in the same direction.

Thus, the apparatus according to this invention is such that, by a simple rotation of the operation shaft in one direction, the pilot gas burner is connected to the gas supply and the piezoelectric firing apparatus is actuated while automatic stop of the shaft is also effected. If the rotating force acting on the shaft is removed after confirmation of the firing, the stop is immediately released, and by further rotation of the shaft full open condition is obtained to effect gas supply to the main burner. Thus, the operation of the control valve can be effected simply by rotating the operation shaft in one direction without any additional steps such as pushing or pulling or the like. If there should be a miss in pilot gas firing at the time of the automatic stop, the same operation as before can be repeated after immediate reverse rotation of the shaft, thereby preventing the supply of a large amount of gas to the main burner, with the pilot burner not fired, Thus, the apparatus can be operated safely.

If only supply to the pilot burner remains after supply to the main burner is stopped by reverse rotation of the operation shaft 6 from the full open position for the main burner to the b position in FIG. 6, it will be convenient for supply of gas to the main burner to be obtained only by rotating the shaft 6 from the position b to the position c. Accordingly, the apparatus of the invention is provided with an arrangement for easily confirming the position b in this direction of reverse rotation. This arrangement will be explained with reference to FIGS. 23 to 27.

The driving plate 28 has a non-circular opening by which it is mounted on the operation shaft 6, the plate being disposed at the outer surface of the front plate of the casing 30 of the piezoelectric firing apparatus 7, the plate 28 being held in position by the resilient holding plate 29 disposed on the outside thereof. The driving plate 28 is provided with a slot 48 inclined by the angle B in relation to the diametral line A of the driving plate 28 as shown in FIG. 23, and a ball 49 such as a steel ball whose diameter is larger than the thickness of the driving plate 28, is contained in the slot 48 so as to be slidable in the longitudinal direction thereof and is held by the holding plate 29. The holding plate 29 is provided with two small holes 50 and 51 positioned in the path of movement of the ball 49.

In the condition of FIG. 23 showing the valve closing position "a," the ball 49 is engaged in the small hole 50. If, from this position, the operation shaft 6 is rotated in the direction of the arrow, the ball 49 escapes from the small hole 50 and moves towards the center of the driving plate 28 as shown in FIG. 24 along the inclination of the slot 48, and thus the ball 49 travels along a path of travel radially inwards of the small hole 51 and accordingly never becomes engaged with the small hole 51. If, from the full open position "C" in FIG. 25, the shaft 6 is rotated in the reverse direction, the ball 40 is pushed outwards in the longitudinal direction of the slot 48 as shown in FIG. 26 and reaches the small hole 51 at the position of FIG. 27 to be engaged therein with a positive stop whereby this rotation position is confirmed. Accordingly, by providing the position of the small hole 51 at the point b in FIG. 6, the operation shaft 6 can be rotated in the reverse direction from the main burner supply position "C" so as to stop the supply to the main burner and stop the rotation at the position b in FIG. 6 where the supply to the pilot burner alone remains. Thereby, there can be eliminated the need to rotate the operation shaft 6 in the reverse direction to the fully closed position each time after service of use and subsequently opening the pilot gas supply and effecting the firing thereof.

Since the slot 48 in the driving plate 28 is inclined in relation to the diametral direction of the plate 28, the ball 28 is moved towards the center of the plate 28 upon rotation of the operation shaft in the valve opening direction so that the ball is not engaged in the hole 51, and the path of travel the ball 49 and the position of the small hole 51 can be designed at will. The driving plate 28 is adapted to serve another function as previously described, but a simple driving plate can also be used.

What is claimed is:

1. A gas control valve apparatus comprising a rotatable valve means having a first closed position, a second position in which gas is supplied to a pilot burner and a third position in which gas is supplied both to the pilot burner and a main burner, piezoelectric firing means for igniting the pilot burner when gas is supplied thereto, an operation shaft coupled to said valve means for rotation therewith to successively rotate the valve means between the first, second and third positions, means coupling said shaft and said piezoelectric firing means for activating the latter when the valve means has reached a firing position after said second position, stop means for halting the rotation of said valve means after operation of said piezoelectric firing means, and means for releasing said stop means to allow continued rotation of the stop means to said third position automatically upon removal of the actuating torque on said operation shaft after activation of the piezoelectric firing means.

2. Apparatus as claimed in claim 1 comprising means joining said valve means and operation shaft in rotation while permitting relative axial movement therebetween, a pin secured on said operation shaft, said stop means comprising a fixed cam facing said pin to prevent rotation of said shaft after said shaft has reached said firing position in which the piezoelectric firing means is actuated, said means for releasing said stop means comprising means to axially displace the shaft to a position in which said pin is displaced from the cam and is capable of traveling therepast upon further rotation of said shaft.

3. Apparatus as claimed in claim 2 wherein said means joining the valve means and the operation shaft comprises a further pin on one thereof and an axial slot in the other slidably receiving said further pin, said means to axially displace the shaft comprising a spring between said valve means and said shaft.

4. Apparatus as claimed in claim 1 wherein said means coupling said shaft and said piezoelectric firing means comprises a pivotal hammer, a spring means urging the hammer into abutment with said firing means and means to cock the hammer against the opposition of said spring means as the rotation shaft travels from said first to said second position and to release the hammer at said firing position so that the hammer strikes the piezoelectric firing means, under the action of said spring means, to activate said firing means.

5. Apparatus as claimed in claim 4 wherein said spring means comprises a leaf spring which is deformed as the hammer is cocked.

6. Apparatus as claimed in claim 4 wherein said means to cock the hammer comprises an arm loosely mounted for pivotal movement about the same axis as said hammer, elastic means resiliently urging the arm in a direction of rotation corresponding to the direction of rotation of the hammer when it strikes the piezoelectric firing unit, means on said operation shaft releasably engaging said arm to rotate the same as the shaft moves from said first position to said firing position and to release said arm in said firing position, and means on said arm to rotate the hammer therewith and cock the same as the arm rotates and to initiate rotation of the hammer in the direction to strike the piezoelectric firing means after release of said arm from said shaft whereafter the hammer travels under the action of said spring means to strike the piezoelectric firing means.

7. Apparatus as claimed in claim 6 wherein said spring means has a dead point in the travel of said shaft from said first position to said firing position, said elastic means acting on said arm upon release of the latter from said shaft to rotate said hammer beyond the dead point of said spring means.

8. Apparatus as claimed in claim 1 comprising means to provide a releasable stop for said shaft when the shaft is rotated in reverse from said third position towards said first position, said valve means continuing to supply gas to said pilot burner at the position of releasable stop of said shaft.

9. Apparatus as claimed in claim 8 wherein said means to provide a releasable stop for said shaft comprises a ball carried by said shaft and a detent for said ball engageable therewith when the shaft rotates in reverse from said third position towards said first position.

10. Apparatus as claimed in claim 9 wherein said means to provide a releasable stop for said shaft comprises a rotatable plate carried in rotation by said shaft, said rotatable plate having a slot inclined with respect to a radius drawn from the axis of rotation of said shaft, said ball being slidable in said slot and projecting therefrom, a fixed member adjacent said rotatable plate on one side thereof and a resilient holding plate on the other side of said rotatable plate acting on said ball to press the same against said fixed member, said detent being constituted by a hole in said holding plate in the path of travel of said ball when the rotatable plate travels from said third position towards said first position for receiving the ball to provide said releasable stop.

11. Apparatus as claimed in claim 10 wherein said holding plate is provided with a second hole to provide a detent for the shaft in said first position, said first and second holes being at the same radii from the axis of rotation of said shaft.

References Cited

UNITED STATES PATENTS

| 3,273,628 | 9/1966 | Puttfarcken | 431—255 |
| 3,348,561 | 10/1967 | MacLennan | 137—66 |
| 3,381,696 | 5/1968 | Krueger | 137—66 |
| 3,428,408 | 2/1969 | Ameyama et al. | 431—255 |

EDWARD G. FAVORS, Primary Examiner

U.S. Cl. X.R.

137—66